Patented Sept. 16, 1941

2,256,253

UNITED STATES PATENT OFFICE 2,256,253

PRODUCTION OF PROTEIN-CONTAINING
UREA-FORMALDEHYDE PLASTICS

Oscar Neuss, Berlin-Charlottenburg, Germany

No Drawing. Application April 6, 1938, Serial No.
200,422. In Germany August 11, 1933

10 Claims. (Cl. 260—6)

The object of the invention is a process for the production of albuminoid-containing plastic masses from urea or its derivatives and formaldehyde as well as products obtained according to this process. An important feature of the invention consists in the fact that there is obtained by a relatively simple process, hardenable masses which can be formed by pressing, the pressed bodies obtained as products in this way having great homogeneity, good properties as regards machinability, considerable elasticity, permanence and resistance against atmospheric influences and water.

It is known to impregnate natural horn meal with urea or thiourea or both and with formaldehyde and to dry, mill and to press the same. These condensates have been produced in neutral media or in the presence of saturated ammonia solutions. The horn meal, however, is in part attacked by the additions of alkalis and a partial break-down of the keratin results. The products so obtained show coloration and poor characteristics in particular after contact with hot water.

It is also known to mix horn meal with a reaction product of urea and formaldehyde in molten condition. In this case, however, the horn meal is non-plastic by reason of the heat and the considerable formaldehyde liberation caused thereby and the products obtained from these masses crack on boring and mechanical working and have a poor appearance.

In order to avoid these difficulties, horn meal has been added to aminoplast subsequently as filling material in the completed urea condensation. The subsequent admixture of horn meal with aminoplast products however, does not lead to sufficiently homogeneous bodies. The horn meal remains as an extraneous body in the aminoplast and homogeneity is lacking which is very undesirable when for example such finished pressed bodies come into contact with water. The individual particles swell in differing degrees and the object is unutilisable. It is similarly the case in further known processes according to which the albumen material is pressed together in the hot with urea formaldehyde condensation products such as methylol derivatives of urethane, methylolurea or methylolamides which only in the hot pressing process split off formaldehyde and thereby effect hardening. This process is always difficult since the urea formaldehyde condensate added to the albumen material must previously be made as such and isolated. Further the finished products show the same poor homogeneity as the previously described products since the albumen material is only admixed in the urea condensation products instead of being distributed in the course of the condensation. The albumen material thus behaves in the pressed product as sand behaves in concrete and the result of such non-homogeneous masses is non-uniform swelling by the action of moisture and unattractive surfaces. Further the pressed bodies are brittle and crack on boring. Finally, it has also been proposed, in order to secure better removal of water from the reaction mixture of urea and formaldehyde with heating, to admix therewith or to knead therewith a swelling carrier material such as albumen containing materials, casein or wheat gluten. When in such a process horn meal is employed as the carrier material there arises as a result of the hardening of the horn albumen by heat and the formaldehyde, a non-plastic horn material which cannot be used in a subsequent moulding operation. This action of formaldehyde upon albumen, in particular keratin, as a coagulating and hardening agent is known. Pressed bodies of horn meal for example can by treatment in formaldehyde be subsequently hardened. The formaldehyde forms an outer hard surface on the keratin, which however hinders deeper penetration into the inner parts of the pressed bodies.

Also the use of formaldehyde-binding substances as additions to urea horn meal condensation products does not, as has been described above, give satisfactory results, since these are only stable in weakly alkaline media, but in acid solution, however, formaldehyde splits off and keratin must be moulded in acid medium. The pressing of horn in alkaline medium leads to a darkening of the pressed bodies and renders them of less value due to the attack upon the albumen of the keratin by alkalis.

It has now been found that all these disadvantages, in particular also the attack of the alkali upon the albumen substances of the horn meal and the decomposition of the keratin occasioned thereby, can be avoided and press masses and pressed bodies of great homogeneity and good properties can be obtained if the manufacture of protein- or albuminoid-containing plastic masses from formaldehyde and urea compounds is carried out in such manner that the urea compounds and a greater than equimolecular proportion of formaldehyde are allowed to react upon each other in an aqueous ammoniacal solution reacting weakly alkaline toward litmus, without external heating (pre-condensation), and thereafter the mixture made weakly acid toward litmus (the reaction product being still in the water-soluble state) and treated with the protein or albuminous material, whereupon the condensation mixture is dried and pressed hot at temperatures above 100° C. For, in the field of urea formaldehyde systems there exist particular compounds that is to say condensates, which can be mixed with keratin even in weakly acid solutions without any noticeable proportions of free formaldehyde acting in a coagulating manner upon the pressed material but which, however, in the subsequent hot pressing process on the one hand lead to resin formation and on the other hand to the splitting-off of formaldehyde and therewith hardening of the keratin albumen. Primarily acid or neutral urea-formaldehyde condensates are excluded in this connection as these, even at ordinary pressure and temperature conditions, split off formaldehyde and unfavourably influence the albumen by prematurely hardening it. Further, such urea-formaldehyde mixtures separate out solid precipitates of condensates in a short time. On the other hand, suitable ammoniacal condensates practically do not show this precipitation even after addition of acid or, if they do, only after a disproportionally long period of action since they bind the free formaldehyde and even after subsequent weak acidification, and this is the decisive point, even with mineral acid in the cold, no precipitate results. Accordingly it is thus possible for the production of binding and hardening materials for keratin to commence with a weakly ammoniacal urea-formaldehyde condensation mixture which for each molecule of urea contains more than one molecule of formaldehyde. With this the albumen material to be bound, and thus particularly the horn meal, is intimately admixed or steeped with acidification, is then dried and if desired milled and the final binding of the constituents is then effected only by the conclusion, in the hot pressing, of the previously incompletely effected condensation of the pressed material in faintly acid condition. The maintenance of the molecular proportion on the one hand and the hydroxyl and hydrogen ion concentrations on the other hand is always of decisive significance as regards the labile character of the condensate to be employed for the hardening.

In the initially ammoniacal mixtures, for example, one molecule of urea is dissolved in about 1.2 molecules of formaldehyde in aqueous solution. Free formaldehyde is rendered nondeleterious by ammonia, that is to say, is only so far neutralized that the solution is faintly alkaline and the free formaldehyde is rendered inactive by the ammonia. Hexamethylenetetramine is therefore not suitable. An unnecessary excess of ammonia is not recommended since in the pressing operation the amines developed thereby unsatisfactorily influence the keratin. The solutions after standing in the cold for some days should no longer smell or taste of formaldehyde. Such a solution is however not suitable for use since the horn meal on pressing in alkaline medium subsequently darkens, becomes brown, and suffers considerably from the action of the alkali under heat and pressure. The condensate must therefore be slightly acidified. Even the slight acidification in the cold should not give any precipitate. With such a solution the horn meal is mixed in such proportion that fundamentally the horn meal is thoroughly soaked through and after attaining the necessary degree of dryness is pressed. Instead of the addition of acid also a weakly acid horn meal that is to say horn meal bleached with $SO_2$ can be used. The faintly acid character of a horn meal bleached with $SO_2$ suffices in some circumstances to give to the labile ammoniacal resin condensate a quite weakly acid character without causing, by a too acid reaction, a precipitation and hardening of the mass. The keratin does not coagulate prior to the pressing and the material can be readily formed into cakes and shows a considerable plasticity in the hot pressing process. The hardening of the pressed goods is effected in the pressing process by the partial splitting off of formaldehyde by the high temperature and simultaneously the high pressure utilised.

Instead of urea also urea derivatives, for example, thiourea or mixtures of urea with urea derivatives can be employed. Also other albumens can be used which, as in the case of keratin, must be protected from the premature action of free formaldehyde prior to the pressing.

In the present process it is thus not a question of a known mixing process in which all possible substances, among which keratin and albumens can also be included, can be distributed as filling materials in the aminoplast material or in which inverted aminoplasts are admixed with such press material. Rather it is a question of a condensation or hardening process of the aminoplast combined with a hardening process for the keratin, that is to say an improvement of the properties thereof by the exchange action of particular suitable labile acid bodies of the formaldehyde urea condensation system upon the horn meal in the pressing process itself. In the same way the present process has nothing to do with the known proposal to dissolve casein in urea with or without additions of alkali then to pour in free formaldehyde and by subsequent strong acid precipitation of the solution to obtain the solid condition. The disadvantages of this method of operation are threefold, namely, the destruction of the albumen by the attack of alkalis in the solution, the addition of free formaldehyde whereby coagulation of the albumen cannot be avoided and finally the use of a solution which is not labile and which is caused to precipitate by addition of acid. In this solidification further free formaldehyde is split off which can react in a coagulating manner upon the albumen even before the hot pressing. According to the process of the present invention, on the other hand, the albumen is in no case dissolved. By the solution of horn in urea (possibly under pressure, with alkalis etc.) a breakdown of the keratin occurs which results in considerable deterioration in the water resistance of the finished, pressed objects. Such pressed objects acquire blemishes even by the action of cold water for a long time. In boiling water the surface thereof becomes rough to wholly deformed. It is thus important in the present process that on the one hand the albumen prior to coagulation is to a far reaching extent protected from free formaldehyde and on the other hand from the attack of free alkaline components (urea and ammonia) of the labile condensation solution by acidification. Finally the solution must be so labile that a mild acidification under usual conditions can bring about no solidification of the aminoplast condensate, the polymerisation and hardening process taking place exclusively in the hot press itself.

Prior to or during the condensation, filling materials, plasticising materials, colouring materials and other additions can be introduced into the reaction mass. Also certain proportions of phenols can be employed as components of the condensation. The horn meal can first be swollen in water and then added to the components of the aminoplast. It is possible, however, also to proceed by allowing the horn meal to swell in the solution of urea and then adding the formaldehyde. The working up to the dried products is effected in the usual manner. From the mass obtained after drying, finished products can be obtained in a single operation by hot pressing. It is also possible, however, to proceed by first pressing or forming into cakes at ordinary or moderate temperature so as not to cause thermosetting, followed by a final pressing in the hot press. The process can be conducted with or without the presence of filling materials.

In the following, a number of examples are given by way of illustration. In the hot press the press material resulting can be formed into all kinds of objects, for example knobs, umbrella handles or the like.

*Example 1.*—60 grs. of urea are dissolved in 120 grs. of 30% aqueous formaldehyde solution. It is then neutralised with ammonia until the solution shows a faint alkalinity towards litmus. The solution is allowed to stand for 3 hours. 150 grs. of the solution are then mixed with 50 grs. of horn meal which has been treated with sulphurous acid, and the paste dried carefully in the air or at moderate temperatures, the dried product, if desired after milling, being subjected to hot pressing at temperatures above 100° C., preferably at 130° C. If desired, the ground product can first be subjected to a slight pressure at relatively low temperature to form it into a coherent, but not yet hardened cake, after which it may be shaped and hot-pressed as stated, the final condensation taking place during such hot pressing.

*Example 2.*—60 grs. of urea are dissolved in 150 grs. of 40% aqueous formaldehyde solution and then neutralised with ammonia until the solution reacts faintly alkaline towards litmus. The solution is allowed to stand for 3 hours. Thereupon 160 grs. of this solution which, in dependence upon the character of the horn meal utilised, has been acidified to give an acid reaction to litmus, is mixed with 50 grs. of horn meal, the product dried and, if desired after milling subjected to the hot pressing process described above.

*Example 3.*—50 grs. of urea and 10 grs. of thiourea are dissolved in 150 grs. of 40% aqueous formaldehyde solution and then neutralised with ammonia until the solution shows a faint alkaline reaction towards litmus. The solution is allowed to stand for three hours. 160 grs. of this solution which is faintly acidified with phosphoric acid is then mixed with 50 grs. of horn meal, the product dried, and, if desired after milling, is subjected to the hot pressing as above.

*Example 4.*—40 grs. of urea and 20 grs. of thiourea are dissolved in 150 grs. of 40% aqueous formaldehyde, then neutralised with ammonia until the solution has a faintly alkaline reaction towards litmus. The solution is allowed to stand for 3 hours. Then 160 grs. of this solution, which is acidified faintly with phosphoric acid, is mixed with 50 grs. of defatted horn meal, the product dried and, if desired after milling, subjected to the hot pressing.

*Example 5.*—50 grs. of urea and 10 grs. of thiourea are dissolved in 150 grs. of 40% formaldehyde and then neutralised with ammonia until the solution reacts faintly alkaline towards litmus. The solution is allowed to stand for 3 hours. Then 160 grs. of this solution which is faintly acidified with phosphoric acid is mixed with 25 grs. of gelatine, the product dried and then, if desired after milling, subjected to the hot pressing.

*Example 6.*—50 grs. of urea and 10 grs. thiourea are dissolved in 150 grs. of 40% formaldehyde and then neutralised with ammonia until the solution reacts faintly alkaline towards litmus. The solution is allowed to stand for 3 hours. 160 grs. of this solution which is faintly acidified with phosphoric acid is mixed with 50 grs. of commercial defatted casein powder, the product dried and, if desired after milling, subjected to the hot pressing.

As already indicated hereinabove, there may be employed in my improved process urea itself and thiourea, as well as other urea derivatives whose condensation reaction with formaldehyde is substantially equivalent to that of urea and thiourea.

I claim:

1. Process for the manufacture of plastic masses from a urea and formaldehyde and containing protein material, comprising causing a urea and a molecular excess of formaldehyde to react upon each other without external heating in an aqueous ammoniacal solution which is weakly alkaline toward litmus, acidifying the reaction mixture until it is weakly acid toward litmus, mixing the same with a protein material, and thereafter drying the reaction mixture.

2. Process according to claim 1, wherein the protein component is horn meal.

3. Process according to claim 1, wherein the protein component is horn meal which has been caused to swell in water prior to mixing with the other reaction components.

4. Process according to claim 1, wherein the reaction under acid conditions is conducted with cooling of the reaction mass.

5. Process according to claim 1, wherein the protein component comprises bleached horn meal containing sufficient $SO_2$ to impart to the reaction mixture a weakly acid reaction toward litmus.

6. A thermo-setting, protein-containing molding composition capable of resisting the action of hot water when in the hardened condition and comprising the dried acidified mixture of a protein material and an initial, water-soluble condensate of a urea and a greater than equimolecular proportion of formaldehyde in weakly ammoniacal solution, substantially no degradation of the protein material having taken place, said protein material being in the substantially unhardened condition, said composition being capable on molding at elevated temperature and pressure of causing hardening of the protein material by release of excess formaldehyde and becoming infusible and insoluble.

7. A thermo-setting molding composition containing keratinous material uniformly distributed therein and capable of resisting the action of hot water when in the hardened condition and comprising the dried acidified mixture of horn meal and an initial, water-soluble condensate of urea and a greater equimolecular proportion of formaldehyde in a weakly alkaline ammoniacal solution, the horn meal being substantially unaffected by the ammonia and being in the substantially unhardened condition, said composition being capable on molding at elevated temperature and pressure of liberating sufficient free formaldehyde to effect hardening of the keratinous material and becoming infusible and insoluble.

8. Process according to claim 1, wherein the urea is urea itself and wherein the molecular proportion of formaldehyde to urea is approximately 1.2:1.

9. Process according to claim 1, wherein the initial condensation of the urea and formaldehyde in the aqueous ammoniacal solution is conducted for about three hours.

10. A composition as set forth in claim 6, wherein the urea is urea itself and wherein the molecular proportion of formaldehyde to urea is approximately 1.2:1.

OSCAR NEUSS.